United States Patent [19]

Reinauer

[11] Patent Number: 4,856,944
[45] Date of Patent: Aug. 15, 1989

[54] COUPLING BETWEEN A TOOL HEAD AND A TOOL SUPPORT

[75] Inventor: Josef Reinauer, Sigmaringen, Fed. Rep. of Germany

[73] Assignee: Gottlieb Guhring KG, Ebingen, Fed. Rep. of Germany

[21] Appl. No.: 167,297

[22] Filed: Mar. 11, 1988

[30] Foreign Application Priority Data

Mar. 26, 1987 [DE] Fed. Rep. of Germany ....... 3709878

[51] Int. Cl.$^4$ ............................................. B23B 51/02
[52] U.S. Cl. ......................................... 408/59; 279/8; 408/144; 408/230
[58] Field of Search ............ 408/59, 144, 230, 239 R, 408/239 A; 76/108 R, 108 T; 279/8

[56] References Cited

U.S. PATENT DOCUMENTS 4,099,889 7/1978 Vig .................................. 408/239 R
4,684,298 8/1987 Roos ..................................... 408/59

Primary Examiner—Z. R. Bilinsky
Attorney, Agent, or Firm—Oblon, Spivak, McClelland, Maier & Neustadt

[57] ABSTRACT

A coupling between a tool head and a tool support exhibits, for rough positioning, a holding fixture pin connection. By at least one fastening bolt running in the axial direction of the tool support, the tool head is braced against the tool support. In doing so the fastening bolt engages through a first screw coupling with the tool head and through a second screw coupling with the tool support. The first and second screw couplings exhibit synchronized threads of differing pitch so that, when tightening the fastening bolt, the tool support and the tool head are braced against each other in the axial direction. Further, the fastening bolt exhibits a centering section which, in the assembled state of the coupling, centers the tool head relative to the tool support. The fastening bolt, in the assembled state of the coupling, is received in its entirety in the inside of the unit formed by the tool support and the tool head and is accessible only through a borehole. Advantageously, this borehole also acts as a coolant borehole. The coolant that flows through it during use accordingly rinses away impurities.

11 Claims, 1 Drawing Sheet

COUPLING BETWEEN A TOOL HEAD AND A TOOL SUPPORT

FIELD OF THE INVENTION

The invention relates to a coupling between a tool head and a tool support wherein the tool head and the tool support are inserted into each other coaxially by a connector in the form of a recess and a projecting part and are braced against each other by at least one fastening bolt.

BACKGROUND OF THE INVENTION

In a known coupling between a tool head and a tool support, the tool support has a holding fixture or a recess, while the tool head is provided with a pin shank part. To connect the tool head to the tool support, the pin shank part is put coaxially into the holding fixture, and the two parts are braced against each other by two screws that run transverse to the longitudinal direction of the tool support (i.e, by a clamping bolt and a countersunk head bolt). Due to the fact that, in this arrangement, screw forces directed transverse to the longitudinal axis of the tool support are converted into clamping forces parallel to the longitudinal axis of the tool support, a complicated spatial state of tension is present at the connection point. Because of this, uniform distribution of tension over the contact surface is difficult to achieve. Further, the extent of the axially oriented clamping force cannot be determined, which means that a stripping of the screw connection or too little bracing can very easily occur. Additionally, to prevent a relative rotation between the tool support and the tool head, a further component in the form of an eccentrically placed positioning pin must be provided. Moreover, the multiplicity of components detracts from an economical use of the coupling.

The clamping bolt and the countersunk head bolt each lie in such a way on the surface of the tool support that, in operation (for example, during machining of a workpiece), they can come into contact with chips and other impurities. Because of this, they are subject to a relatively great abrasion. When fine chips or metal dust penetrate the thread sections of the screws, a reliable screw connection is no longer assured, and a destruction of the thread can occur.

OBJECT OF THE INVENTION

The object of the invention is to provide a coupling between a tool head and a tool support which assures in the simplest possible way a secure mutual bracing of the components and in which a complicated spatial state of tension on the connection point is avoided as much as possible.

SUMMARY OF THE INVENTION

A coupling between a tool head and a tool support according to the invention assures a quick and secure interchangeability of a tool head, and essentially only axially oriented clamping forces occur. By using a torque wrench, predetermined initial stressing forces can be achieved by which a connection that is adapted to certain conditions is possible between the tool head and the tool support.

By designing a centering section according to the invention, an exact orientation of the tool head relative to the tool support can be achieved without impairing the rapid interchangeability of the tool head.

By an arrangement of the fastening bolt according to the invention, the fastening bolt is protected to the greatest extent possible from the penetration of impurities. If, further, the borehole through which the fastening bolt is accessible is formed by a cooling channel borehole, the penetration of impurities can be completely avoided, since the cooling channel borehole constantly has fluid passing through it during operation. Further, by this cooling a seizure of the thread of the fastening bolt as a result of overheating is effectively prevented.

The arrangement of the sealing element according to the invention assures that, at the connection point between the tool head and the tool support, no coolant or other fluid located on the inside of the tool can unintentionally come out.

Especially in the embodiment of the coupling with the centering section, which is preferably located between the thread sections, the coupling is suited to a special degree for the connection of precision tool heads with universal shanks of machine tools. The positioning accuracy of the tool cutting edges of the tool head can thus be increased with a pair of diametrically opposed centering sections in the micron range.

Further goals, applications, and advantages of the invention will be become apparent from the following detailed description of a preferred embodiment with reference to the attached drawings.

BRIEF DESCRIPTION OF THE DRAWINGS

FIG. 1 shows a coupling between a tool head and a tool support in section according to one embodiment of the invention.

DETAILED DESCRIPTION OF THE PRESENTLY PREFERRED EMBODIMENT

Figure 1A:
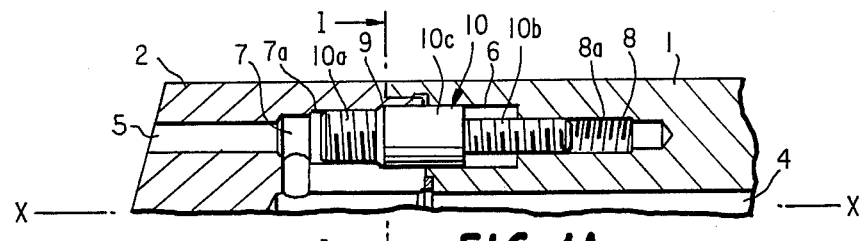
FIG. 1a shows the assembled state of the coupling.

According to the figures, a tool support in the form of a spiral body 1 has an essentially cylindrical form and consists of a metallic material, preferably steel. The spiral body 1 is provided with spiral-shaped grooves. Along its longitudinal axis X—X, a center borehole 4 is formed through which, in operation, a coolant is fed. On its left end according to FIG. 1, the spiral body 1 has a recess 1b which is bounded by ring segment sections 1a.

A tool head in the form of a spiral head 2, which can be provided with bits or the like on its left side end according to FIG. 1 and likewise consists of a metallic material, like steel or another hard metal, contains two diametrically opposed coolant boreholes 5 that run parallel to the longitudinal axis X—X and that are connected to each other and to a central borehole 3 by a transverse channel 5a. On its end facing the spiral body 1, the spiral head 2 has a graduation 2a that is matched in its form to recess 1b. In this way the spiral head 2 with its graduation 2a can be put into the recess 1b of the spiral body 1, and ring segment sections 1a of the spiral body 1 come to lie in contact with an adjacent support surface 2b of the spiral 2. When the spiral head 2 is put into the spiral body 1, central boreholes 3 and 4 are aligned so that the central borehole 4 is connected through the central borehole 3 and the transverse channel 5a with coolant boreholes 5. Between the spiral body 1 and the spiral head 2, a sealing element 11 can be placed for sealing purposes around the central boreholes 4 or 5.

Figure 3:
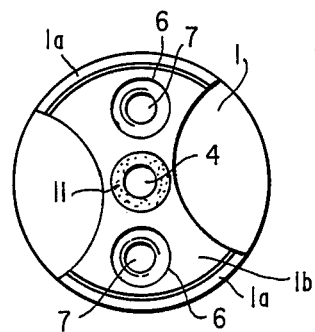
FIG. 3 is a side view of the tool support in the direction of arrow I in FIG. 1.
Figure 4:
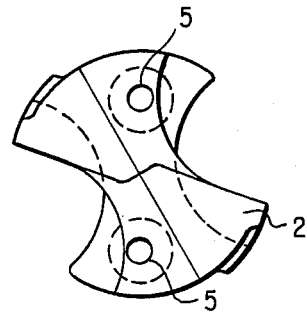
FIG. 4 is a side view of the tool head in the direction of arrow II in FIG. 1.

In the spiral head 2, in alignment with each of the coolant boreholes 5, a first borehole 7 is formed which is provided with a first thread 7a in the form of an internal thread. Accordingly, the spiral head 2 is penetrated by boreholes that are formed by first boreholes 7 and coolant boreholes 5 which are in alignment. The position of the axis of each coolant borehole 5 and the corresponding first borehole 7 is selected in such a way that the first borehole 7 emerges essentially in the center of the boring tool crosspiece (see FIG. 3) on the side facing the tool support 1, and the coolant boreholes 5 originates from an open space of the tool head 2. On the side facing the spiral body 1, the first borehole 7 is provided with a threadless section of larger diameter (i.e., an expansion) 9.

In the spiral body 1, two second boreholes 8 are formed which run parallel to the longitudinal axis X—X and which are provided with a second thread 8a in the form of an internal thread. On the side facing the spiral head 2, the second borehole 8 is provided with a threadless section of a larger diameter (i.e., an expansion) 6. The diameter of the expansion 6 corresponds to the diameter of the expansion 9. When the spiral head 2 is put into the recess 1b of the spiral body 1, the coolant boreholes 5, first boreholes 7, expansions 6 and 9, and the second boreholes 8 are aligned. First and second threads 7a and 8a are formed as synchronized threads that, however, have a different thread pitch.

Each of two clamping bolts or fastening bolts 10 has a first external thread section 10a, a second external thread section 10b, and a bolt or centering section 10c. The first external thread section 10a of each of the clamping bolts 10 can be screwed into one of the first boreholes 7, and the second external thread section 10b of each of the clamping bolts 10 can be screwed into the corresponding second borehole 8. Further, the diameter of the bolt section 10c is matched to the diameter of the expansions 6 and 9.

Using the clamping bolt 10, the spiral head 2 is tightened on the spiral body 1 in the way described below.

Figure 1B:
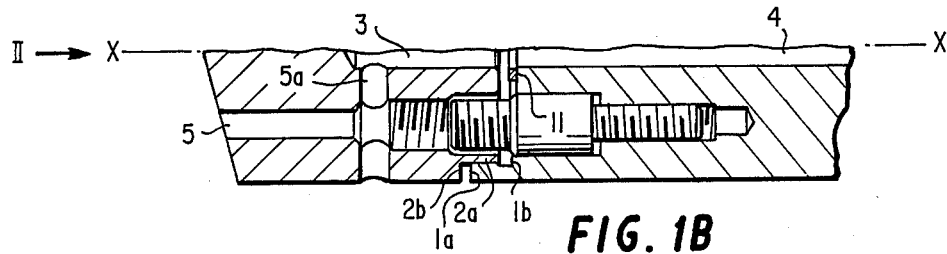
FIG. 1b shows the disengaged state.
Figure 2:
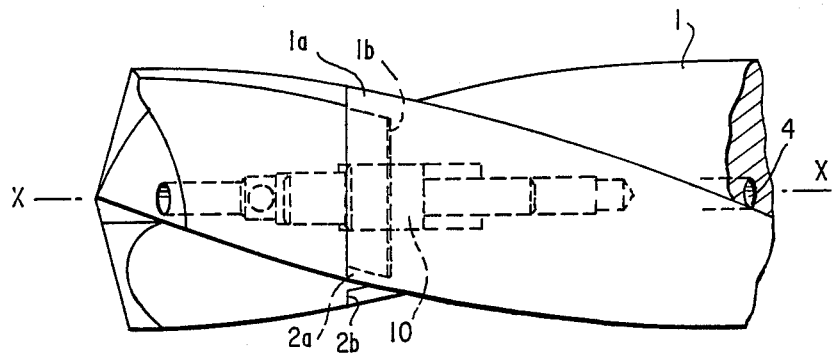
FIG. 2 is a top view of the coupling according to FIG. 1.

In the disengaged state of the coupling, each clamping bolt 10 is screwed into the spiral body 1 through the engagement of the second external thread section 10b in the second thread 8a of the corresponding second borehole 8, and the bolt section 10c is received without play in the corresponding expansion 6. Then the spiral head 2 with the graduation 2a is put into the recess 1b of the spiral body 1. At this point, a gap remains between the spiral head 2 and the spiral body 1. This state is shown in FIG. 1b.

Through each coolant borehole 5, a tool for turning the clamping bolt 10 (for example, a wrench for socket head cap screws) is guided which can enter into operative engagement with the corresponding clamping bolt 10 in a suitable way. Turning the clamping bolt 10 causes it, on the one hand, to be screwed out of the second borehole 8 and, on the other hand, to be screwed into the first borehole 7. During this movement, the bolt section 10c of each clamping bolt 10 is moved into the expansions 6 and 9 in such a way that it is received partially in the expansion 6 and partially in the expansion 9, by which it exerts a centering effect. Since the first and second threads 7a and 8a and the first and second external thread sections 10a and 10b have different thread pitchs (the thread pitch of the first thread 7a being greater than the thread pitch of the second thread 8a), the spiral head 2 and the spiral body 1 are moved toward each other. After installation of the ring segment sections 1a on the support surface 2b, the spiral head 2 and the spiral body 1 are braced against each other, whereby they are fixed in their mutual position. In doing so they are braced in the axial direction through ring segment sections 1a and the support surfaces 2b. The assembled state of the coupling is shown in FIG. 1a. It can be seen there that sealing element 11, because of the prevailing tension, is fixed in its position and that the bolt sections 10c, because of their position in the assembled state, mutually center the spiral head 2 and the spiral body 1.

By the choice of suitable, different thread pitches of the synchronous threads, it is possible to achieve speed transmissions of the desired size. Thus, in the fastened state essentially only axial forces act, and the axial and torsional forces appearing during use are absorbed by the same component. This assures a simpler flux of forces than in the prior art, and tension variation and the occurrence of complicated spatial tension conditions are largely avoided.

The coupling between the tool head or the spiral head and the tool support or the spiral support makes possible a rapid and secure interchange of the tool head in case of need. Additionally, reproducible initial stressing forces can be achieved with the use of a torque wrench.

Since the clamping bolts are accessible only through the channels through which a coolant flows during operation and which are thus constantly rinsed, penetration of impurities or metal chips to the clamping bolt is prevented, and the clamping bolts are subject to only a limited abrasion or wear.

In modifying the embodiment, it is possible to arrange a multiplicity of clamping bolts instead of two clamping bolts and the corresponding boreholes. This considerably reduces the forces and tensions occurring on the individual clamping bolts, and the individual clamping bolts can be formed either smaller or, retaining their size, can transmit a greater force.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A tool comprising:
 (a) a tool head having:
  (i) a longitudinal axis and
  (ii) at least one first internal thread having a first pitch and being parallel to said longitudinal axis of said tool head;
 (b) a tool support having:
  (i) a longitudinal axis that is coaxial with the longitudinal axis of said tool head and
  (ii) at least one second internal thread having a pitch different from said first pitch and being parallel to said longitudinal axis of said tool support, said at least one second internal thread being coaxial and synchronized with said at least one first internal thread; and
(c) at least one fastening bolt comprising:
  (i) a first external thread section threadably engaged in said at least one first internal thread and
  (ii) a second external thread section threadably engaged in said at least one second internal thread, wherein:
(d) said tool head has at least one first borehole that is coaxial with said at least one first internal thread and that is open towards said tool support;
(e) said tool support has at least one second borehole that is coaxial with said at least one second internal thread and that is open towards said tool head; and
(f) said at least one fastening bolt further comprises an unthreaded, cylindrical centering section intermediate said thread sections, said centering section being received without play in said at least one first borehole and in said at least one second borehole.

2. A tool as recited in claim 1, wherein:
(a) said at least one fastening bolt is received in its entirety inside said tool head and said tool support when said tool is in its assembled state and
(b) said at least one fastening bolt is accessible only through a borehole when said tool is in its assembled state.

3. A tool as recited in claim 2, wherein said borehole is parallel to said longitudinal axis of said tool head.

4. A tool as recited in claim 1, wherein said borehole is a coolant borehole.

5. A tool as recited in claim 1, wherein:
(a) said tool head has two first internal threads arranged in a diametrically opposed manner;
(b) said tool support has two second internal threads arranged in a diametrically opposed manner; and
(c) a fastening bolt as recited in claim 1 is threadably engaged in each one of said two first and second internal threads.

6. A tool as recited in claim 1, wherein said tool head and said tool support are both made of a metallic material.

7. A tool as recited in claim 6, wherein said tool head is made of a hard metal.

8. A tool as recited in claim 6, wherein said tool support is made of a hard metal.

9. A tool as recited in claim 1, and further comprising a sealing element placed between said tool support and said tool head.

10. A tool as recited in claim 1, wherein said first pitch is larger than said second pitch.

11. A coupling between a tool head and a tool support, said tool head and said tool support being fitted coaxially into each other by means of a fitting connection in the form of a recess and a projection and being braced to each other by means of at least one fastening bolt, and said fastening bolt extending in axial direction of said tool support and being adapted to engage with said tool support via a thread, characterized in that:
(a) said fastening bolt is adapted to engage with said tool head via a further thread, said threads being synchronous threads having different gradients so that, when tightening said fastening bolt, said tool support and said tool head are braced to each other in axial direction, and
(b) said fastening bolt includes a centering portion which is taken up free from play in the assembled state of said coupling partly in an expansion of a bore of said tool support and partly in an expansion of a bore of said tool head for centering said tool support with respect to said tool head.

* * * * *